United States Patent Office 2,965,439
Patented Dec. 20, 1960

2,965,439

REMOVAL OF ACETYLENE FROM AIR

Holger C. Andersen, Morristown, and Duane R. Steele, Newark, N.J., assignors, by mesne assignments, to Engelhard Industries, Inc., Newark, N.J., a corporation of Delaware No Drawing. Filed Sept. 9, 1957, Ser. No. 682,591

3 Claims. (Cl. 23—4)

This invention relates to a process for the removal of acetylene from air, and more particularly to a process for the removal of acetylene from air in which an air-acetylene mixture is passed over a palladium-containing catalyst, to oxidize the acetylene to carbon oxides.

One of the most serious hazards in the manufacture of oxygen, nitrogen and other products produced from the fractional distillation of liquid air, arises due to the presence of acetylene in the air entering the compression step of the liquefaction process. In processes of this type, air is compressed, cooled and liquefied, and the desired components are then obtained by fractional distillation of the liquefied air.

At the temperature employed in the liquefaction step, acetylene freezes to a solid which is immiscible with any of the other constituents, and as a consequence of its low vapor pressure and immiscibility, it is not removed from the process equipment either by volatilization or by liquid removal steps. Accordingly, the acetylene continues to accumulate, and eventually forms deposits which are extremely dangerous because of the tendency of acetylene to explode spontaneously. In the liquid air industry, the hazard is recognized as a serious one even when the air entering the process contains only a few parts per million of acetylene. Since many liquid air plants are located in areas where the air is contaminated, the practical solution of this problem is a matter of considerable importance. For example, in areas near petroleum refineries, waste hydrocarbons may be present in the atmosphere in quantities sufficient to result in an acetylene content of 5 to 10 parts per million. For liquid air plants of large capacity, it is estimated that the acetylene content must be limited to less than 1 part per million, and preferably less than 0.1 part per million.

Various methods have been employed in the past to combat this hazard, and one such method is to provide a long pipe line to the suction side of the compressors used for air liquefaction, but it has been found in many cases that an excessively long pipe line is necessary in order to obtain air of the required purity, and the expense of such an installation is prohibitive. Another method is to employ an adsorbent, such as silica gel, to remove the acetylene, the silica gel being regenerated by a periodic heating step, but this method has not proved to be consistently successful in practice.

Another method which has been proposed is a catalytic process in which the acetylene is burned to carbon oxides and water, which are harmless or removable by conventional means. A serious disadvantage of such methods, as previously practiced, is that a relatively high temperature has been required to effect the combustion, which necessitates heating large volumes of air, and thereby increases the overall production cost.

In accordance with the present invention, a process is provided which overcomes the foregoing disadvantages, inasmuch as acetylene removal can be successfully accomplished at temperatures normally developed in the process of air compression. Generally speaking, the invention resides in the use of a supported palladium metal-containing catalyst to oxidize the acetylene present in air at low concentrations, at temperatures obtainable by air compression alone.

For adiabatic air compression, the temperature $T_2$ produced by compressing air from pressure $P_1$ to $P_2$ can be calculated from the relationship:

$$T_2 = T_1 \left(\frac{P_2}{P_1}\right)^{\frac{\gamma-1}{8}}$$

where $T_1$ is the initial temperature and $\gamma$ is the ratio of specific heat at constant pressure to that at constant volume. For air, this ratio has the numerical value 1.40. If a gas at 70° F. and 14.7 pounds per square inch absolute pressure is compressed adiabatically to 100 p.s.i.a., the temperature theoretically attained will be:

$$530\left(\frac{100}{14.7}\right)^{0.285} = 917° \text{ R.} = 457° \text{ Fahrenheit}$$

Theoretically, then, any catalyst which will effect combustion of acetylene with the oxygen of the air at this temperature will be successful, but temperatures actually obtained in air compression are much lower for a number of reasons. Actual temperatures obtained are in the neighborhood of 300° F. (149° C.), and operation of a catalyst at or below the latter temperature, without supplying external heat, then becomes necessary for economical process operation.

Among the catalysts which may be used in the process of the present invention are 0.1 to 2 percent palladium metal, either per se or in admixture with minor quantities of other platinum group metals, supported on materials such as activated alumina, silica gel, alumina-silica and other materials of high porosity and surface area. The preferred range of palladium metal per se is 0.2 to 1 percent, the palladium metal preferably being supported on activated alumina.

The air-acetylene mixture may be passed over the catalyst at a space velocity in the range of about 3,000 to 100,000 standard volumes of gas per volume of catalyst per hour. The higher the available compressed air temperature, the higher will be the space velocity affording acetylene removal, and for temperatures normally available in liquid air plants, the range will be about 5,000 to 50,000 standard volumes per volume per hour, the lower limit being set chiefly by economic rather than technical considerations.

The process may be operated at a pressure within the range of atmospheric to about 1,000 p.s.i.g., and as a practical matter, the temperatures necessary to economical operation of the process will be produced by pressures in excess of about 50 p.s.i.g. The reaction temperature is in the range of 90 to 400° C.

The process of the invention is applicable to gas mixtures containing air, water from about 0 to 15 percent by volume, and acetylene from 0 to about 50 parts per million. In addition, the process is applicable to any inert gas-acetylene-oxygen mixture containing more than approximately 1 percent oxygen, up to and including substantially pure oxygen.

It is also within the scope of this invention to add a small amount of hydrogen to the air stream immediately upstream of the palladium catalyst bed. Such addition may be desirable at certain times, such as startup, when the steady-state temperature produced by gas compression has not yet been attained, for example. The added hydrogen will burn catalytically, releasing sufficient heat to raise the air temperature about 82° C. per percent of hydrogen added. Such hydrogen addition need not be in the form of pure hydrogen, but may be in the form of less expensive mixtures such as hydrogen-nitrogen which are produced by the catalytic combustion and dissociation of ammonia.

The invention will be further illustrated by reference to the following specific examples:

EXAMPLE I

A synthetic acetylene-air mixture was prepared by adding known quantities of acetylene and air to a high pressure cylinder. The normal acetylene content, which was checked by analysis, was 10 parts per million. This mixture was passed at the rate of 100 liters per hour, measured at atmospheric pressure, through a bed of catalyst weighing 10 grams and consisting of 0.5 percent by weight palladium metal supported on ⅛″ cylindrical pellets of activated alumina. The catalyst was contained in a steel reactor, equipped with a thermocouple and operable at elevated pressure. The bed temperature was varied and gas samples taken downstream of the bed were analyzed for acetylene content by a method sensitive to approximately 0.5 part per million. In some of the experiments, water was added to the gas stream by passing the gas mixture through a saturator. The following table shows how acetylene removal varies with temperature and other variables:

Table

| Temperature, °C. | Pressure, p.s.i.g. | Water Content, percent by volume | Residual acetylene, p.p.m. |
|---|---|---|---|
| 142 | 200 | <0.1 | <0.05 |
| 130 | 200 | <0.1 | <0.05 |
| 107 | 200 | <0.1 | 0.05 |
| 96 | 200 | <0.1 | 0.13 |
| 198 | 200 | 3 | <0.1 |
| 136 | 200 | 3 | <0.1 |
| 110 | 200 | 3 | .3 |

From the foregoing table it is apparent that acetylene removal is accomplished at a temperature of 107° C. with essentially dry gas, and at a temperature of 136° C., or less, with a gas containing 3 percent by volume of moisture. Subsequent experiments have shown that when the water content is further increased, the "threshold" temperature is raised slightly beyond that characteristic of a gas mixture containing 3 percent per volume of moisture. This makes the process practical for air saturated at normal atmospheric conditions and subsequently compressed.

EXAMPLE II

An air mixture containing 10 parts per million of acetylene was passed through a steel reactor containing a catalyst consisting of 0.5 percent by weight of palladium metal supported on activated alumina. The air flow rate employed was 100 liters per hour, measured at atmospheric pressure, the catalyst charge weighed 10 grams and the reactor pressure was 100 p.s.i.g. The catalyst temperature was varied by adjusting an appropriate electric heater, and downstream air samples were taken for analysis. At temperatures of 141 and 130° C., less than 0.1 part per million acetylene was found, and at a temperature of 112° C., 0.97 part per million passed through the reactor.

EXAMPLE III

The general procedure of Example II was repeated, except that the air stream was passed through a water saturator which introduced 5 percent by volume of water vapor into the stream at a pressure of 100 p.s.i.g. At reactor temperatures of 186, 162 and 146° C., less than 0.1 part per million of acetylene was detected in the reactor effluent, while at a temperature of 130° C., 0.3 part per million was found.

EXAMPLE IV

The general procedure of Example III was repeated, except that 12 percent by volume of water vapor was introduced into the air stream. Less than 0.1 part per million of acetylene was found in the effluent when a reactor temperature of 147° C. was employed, while at temperatures of 140° C. and below, a few tenths of 1 percent of acetylene were found.

It will be obvious to those skilled in the art that many modifications may be made within the scope of the present invention without departing from the spirit thereof, and the invention includes all such modifications.

What is claimed is:

1. In the fractional distillation of liquefied air, the improvement which consists of eliminating acetylene therefrom by passing the original compressed air, at a temperature in the range of 100 to 200° C., resulting from the heat of the compression, over a palladium-containing catalyst of which palladium is the major catalytic component.

2. A process according to claim 1 in which the catalyst is palladium metal on a support.

3. A process according to claim 1 in which the catalyst is palladium metal supported on activated alumina.

References Cited in the file of this patent

UNITED STATES PATENTS 1,836,927   Linckh et al. _____ Dec. 15, 1931

OTHER REFERENCES

Mellor: "A Comprehensive Treatise on Inorganic and Theoretical Chemistry," Longmans, Green and Co., New York, vol. 15, 1936, pages 630–631; vol. 16, 1937, page 1.